United States Patent [19]

Bostica et al.

[11] Patent Number: 5,450,225
[45] Date of Patent: Sep. 12, 1995

[54] OPTICAL SWITCH FOR FAST CELL-SWITCHING NETWORK

[75] Inventors: Bruno Bostica, Pino Torinese; Paola Cinato; Alfredo De Bosio, both of Turin, all of Italy

[73] Assignee: Cselt-Centro Studi E Laboratori, Turin, Italy

[21] Appl. No.: 348,770

[22] Filed: Dec. 2, 1994

Related U.S. Application Data

[63] Continuation of Ser. No. 69,527, Jun. 1, 1993, abandoned.

[30] Foreign Application Priority Data

Jun. 15, 1992 [IT] Italy ............................. TO92A0510

[51] Int. Cl.⁶ .............................................. H04J 14/08
[52] U.S. Cl. ................................... 359/139; 359/135; 359/117; 370/58.2; 370/60.1; 370/94.1; 340/825.03
[58] Field of Search ............... 359/123, 117, 128, 135, 359/139, 140; 370/58.2, 60, 60.1, 91, 94.1, 109, 94.2; 340/825.03, 825.79; 385/16–17, 24

[56] References Cited

U.S. PATENT DOCUMENTS

| 4,845,702 | 7/1989 | Melindo | 359/135 |
| 5,105,292 | 4/1992 | Le Roy et al. | 359/123 |
| 5,121,240 | 6/1992 | Acampora | 359/138 |

FOREIGN PATENT DOCUMENTS

| 0224244A2 | 6/1987 | European Pat. Off. | |
| 0282071 | 9/1988 | European Pat. Off. | |
| 0334054 | 9/1989 | European Pat. Off. | 359/117 |
| 0411562A2 | 2/1991 | European Pat. Off. | |
| 0437197 | 7/1991 | European Pat. Off. | |

OTHER PUBLICATIONS

IBM Technical Disclosure Bulletin, vol. 34, No. 4B, Sep. 1991; pp. 360–362, XP189604; "Bundling Short Packets in an ATM or Packet Network".

Journal of Lightwave Technology, vol. 10, No. 2, Feb. 1992; pp. 265–272, XP267498; "Ultrafast Photonic ATM Switch with Optical Output Buffers", Y. Shimazu.

Takahashi et al., "An Experimental Photonic ATM Switching System Using An Inp Semiconductor Optical Switch" Globe Com. IEEE Global Telecommunicational Conference, 2–5 Dec. 1990, pp. 1586–1589.

P. Cinato & A. de Bosio, Optical Technology Applications To Fast Packet Switching, pp. 233–236, Mar. 13, 1989.

P. Cinato, B. Costa, A. Daniele, A. De Bosio, E. Vezzoni, Electro–Optical Switching Node Based On Fast Packet ..., Oct. 5, 1990, pp. 325–331 CSELT Tech. Report.

Kai Y. Eng, Photonic Knockout Switch For High-Speed Packet Networks, 47.2.1 through 47.2.5, AT&T Bell Laboratories, Nov. 15–18, 1987.

*Primary Examiner*—Leo H. Boudreau
*Assistant Examiner*—Kinfe-Michael Negash
*Attorney, Agent, or Firm*—Herbert Dubno

[57] ABSTRACT

The optical switch for fast cell-switching networks comprises an optical interconnection network (CM) and an electrical control network (CT). In order to fully exploit optical component capabilities and to overcome the constraints imposed by operating speed limits of electronic components, each input (IN1 ... INk) of the interconnection network (CM) is associated with units (PAC1 ... PACk) forming aggregates of cells which are to follow a same path through the interconnection network and time-compressing the aggregates, and each output (OU1 ... OUk) is associated with units (PAD1 ... PADk) for the time expansion of the aggregates and separation of the aggregate cells.

14 Claims, 4 Drawing Sheets

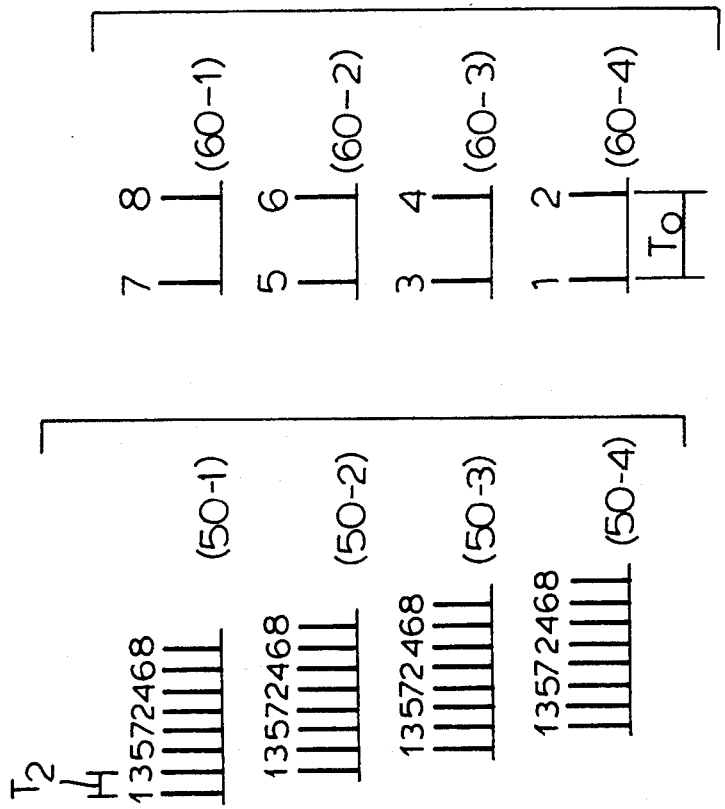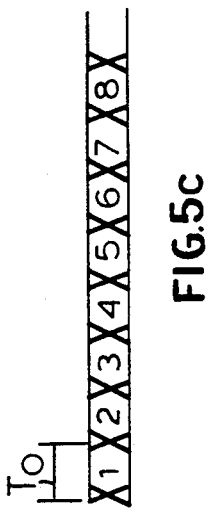

OPTICAL SWITCH FOR FAST CELL-SWITCHING NETWORK

This is a continuation of application Ser. No. 08/069,527 filed on 1 Jun. 1993, now abandoned.

FIELD OF THE INVENTION

The present invention relates to optical telecommunication systems, and more particularly, to an optical switch for fast cell-switching networks.

BACKGROUND OF THE INVENTION

The cell (or packet) switching technique, also called ATM from the initials of the designation "Asynchronous Transfer Mode", is becoming increasingly important for switching digital flows at very high rates, such as the flows present in digital broadband integrated service networks. In this technique, the information relevant to the various services is organized into adjacent units with a fixed length (about 400 bits), called "cells", comprising an information field and a header field, carrying the connection identifier together with other service information.

Due to the rate and bandwidth requirements of integrated service networks, the use of optical technologies has increased interest in the realization of both transmission lines and switching function. At the present state of technology, however, optical technologies do not allow high processing capacities, and the optical switching systems require the use of an electrical control part (therefore with a high processing capacity) and of an optical transport part (with a high capacity of information flow throughput). Examples of these networks have been described, for example, in the European Patent Applications EP-A-0 224 244 and EP-A-0 411 562 and in the papers: "A Photonic Knockout Switch For High-Speed Packet Networks", presented by K. Y. Eng at the IEEE/IEICE Global Telecommunications Conference 1987, 15–18 Nov. 1987, Tokyo, Japan; "Optical Technology Application to Fast Packet Switching" presented by P. Cinato and A. de Bosio, at the Topical Meeting on Photonic Switching, 1–3 Mar. 1989, Salt Lake City, USA; "Electro-Optical switching node based on fast packet and frequency switching techniques", presented by A. de Bosio et al. at the International Switching Symposium, May 1990, Stockholm, Sweden.

Electronic control units however have operating speed limits which could prevent full exploitation of the optical part capabilities because they limit the bit rate on the input lines to the node.

OBJECT OF THE INVENTION

The object of the invention is to provide an optical switch allowing full exploitation of the capacity of the optical components, and which utilizes information flows at a very high rate within it, nevertheless utilizing an electronic control part.

SUMMARY OF THE INVENTION

According to the invention the switch comprises an interconnection optical network, an electrical control network, termination devices for each switch input and each switch output, splitting information to be forwarded to the electrical control network from the information to be processed in the interconnection network, and recombining into the cell flow the information coming from the control network and from the interconnection network, and means for the time compression of signals to be switched and the time re-expansion of switched signals. According to the invention:

each input of the interconnection network is assigned to means forming cell aggregates by associating a plurality of cells which must follow the same path through the interconnection network, and performing the time compression by acting on the aggregates, so as to form information units whose duration is equal to a predetermined fraction of the original duration of an aggregate and the information content of which, as a number of bits, is equal to the sum of the information contents of the aggregate cells;

the electrical control network manages the switching, through the optical interconnection network, at the cell aggregate level; and each output of the interconnection network is assigned to means for said time expansion, in order to bring the aggregates outgoing from the interconnection network back to the original duration, and to separate the individual cells before forwarding them on the output lines.

Time compression of packets to be switched through an optical switching network is known from Patent No. 1217130 granted in Italy to the present assignee. In that system individual packets are compressed which are made up of electrical signals, converted into optical form after compression.

The switch is preferably an ATM digital cross-connect system and the aggregation and compression means form cell aggregates relevant to the same virtual path. The application of the invention to a cross-connect system is useful because the traffic to be switched is sufficiently high to allow the formation of cell aggregates without introducing excessive delays.

BRIEF DESCRIPTION OF THE DRAWING

The above and other objects, features, and advantages will become more readily apparent from the following description, reference being made to the accompanying drawing in which:

FIGS. 3a to 3e are diagrams of the compression operation;

FIGS. 5a to 5c are diagrams showing the decompression.

SPECIFIC DESCRIPTION

Figure 1:
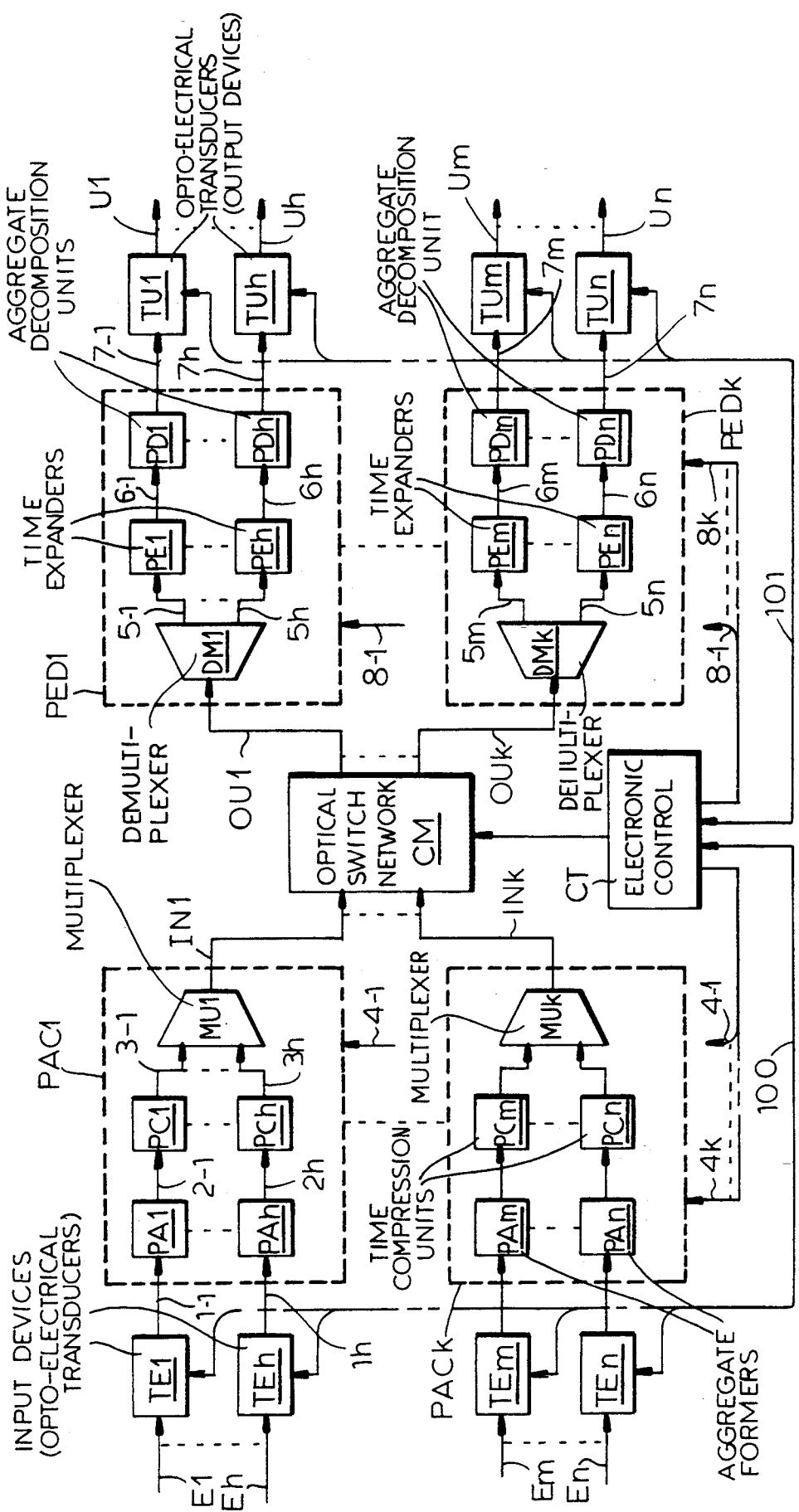
FIG. 1 is a block diagram which shows the general structure of a switch according to the invention.

The drawing shows an ATM digital cross-connect system comprising an optical switching network and an electronic control network. As it is known an ATM cross-connect system switches ATM flows at a virtual path level. A virtual path is generally comprised of semipermanent cells, so that a cross-connect system does not require very frequent re-configuration; this is a typical application where, after configuring the switching network, throughput of a large quantity of traffic must be guaranteed, and it is therefore important that electronic control units should not create any constraint.

According to the invention, this elimination of constraint is obtained thanks to the presence of cell flow processing units, inserted on one side between the line and exchange termination devices providing re-synchronization, extraction of ATM flows from any transmission carriers, label conversion at a virtual path level, conversion into an electrical form of the signalling information to be supplied to the control units, etc. and the inputs of the switching network, and inserted on the other side between the outputs of the switching network and the termination devices providing the complementary operations required for inserting the cells again on the transmission carriers.

In FIG. 1 the optical connection network is indicated by CM, the electrical control network by CT and the line and exchange termination devices respectively assigned to input optical connections E1 ... Eh ... Em ... En and to the output connections U1 ... Uh ... Um ... Un by TE1 ... TEh ... TEm ... TEn, TU1 ... TUh ... TUm ... TUn. The termination devices TE, TU are well known in the art and they are not part of the invention and will not be described in detail. A possible example of realization is anyhow described in EP-A-0 411 562.

Outputs 1 (1-1 ... 1n) of the devices TE are connected to units PAC1 ... PACk, each of which receives the cells outgoing from one or more devices TE. In the drawing, in particular, the outputs of the devices TE1 ... TEh are connected to PAC1 and those of the devices TEm ... TEn to PACk. The number of lines connected to the units PAC is the same for all these units.

The units PAC comprise, for each of their input lines:

means PA (PA1 ... PAh ... PAm ... PAn) forming cell aggregates relevant to the same virtual path, and attaching to each aggregate a label, valid inside the cross-connect system, to allow management of aggregates by the control units CT in the same way as the individual cells are usually managed in an ATM switch; and means PC (PC1 ... PCh ... PCm ... PCn), performing a time compression of the bits inside the aggregates present on output 2 (2-1 ... 2h ... 2m ... 2n) of the relevant aggregation device, by reducing the duration of each aggregate by a preset factor C.

When the number k of the inputs/outputs IN, OU in the connection network CM is less than the number n of the inputs/outputs E, U of the switch, as shown in the example, each unit PAC includes also a multiplexer MU (MU1 ... MUk) cyclically scanning the outputs 3 (3-1 ... 3h ... 3m ... 3n) of all the compression means PC and concentrating the compressed aggregates on these outputs onto an input line IN (IN1 ... INk) to the CM switching network. Control signals for multiplexers MU are supplied by the system time base, which is part of the control units CT, through the proper connection wires 4-1 ... 4k, representing the entirety of the connections for signal exchange between units PAC and control units CT.

In a typical example, the cross-connect system can have 512 input/output links E/U and use a switching network CM (with 64 inputs/outputs); each input link can convey cells related to 10 virtual paths; the aggregates (having the same dimensions) can comprise from 8 to 16 cells.

As a result of the aggregation and compression information units are obtained with a duration substantially equal to that of a cell but with contents equal to the sum of the contents of all the cells of an aggregate, and they convey therefore a much greater quantity of information in a time unit. The electronic control unit CT processes these information units instead of the individual ATM cells and hence does not have any special speed requirements and will not set any constraints to the optimal exploitation of the optical switching network. The fact that cell aggregates are to be processed instead of individual cells does not imply any modification in this control unit, the structure of which is therefore analogous to that already proposed for ATM switches. As a consequence of aggregation and compression, there will be a proportional increase of the necessary bandwidth, which requires the use of an optical technology for the switching network CM.

Time compression factor C (which can be of the same order of magnitude as the number of cells forming an aggregate) will preferably not be lower than the ratio n/k between cross-connect system inputs and CM connection networks inputs. In this way guard times between aggregates can remain to make connection network operations easier. This becomes specially important if a cell and frequency switching is carried out in the cross-connect system, as described in the mentioned paper by A. de Bosio et al. and in EP-A-O-411 562.

Outputs OU1 ... OUk of the switching network CM are connected to demultiplexers DM1 ... DMk, belonging to respective units PED1 ... PEDk which perform inverse operations of the units PAC. Each demultiplexer DM has one input and as many outputs as the inputs of a multiplexer MU. Outputs 5-1 ... 5h ... 5m ... 5n of demultiplexers DM are connected to respective means PE1 ... PEn for the time expansion of the aggregates, followed in their turn by means PD1 ... PDn for the decomposition of the aggregates into individual cells. Means PD receive from means PE the aggregates to be decomposed through the respective connections 6-1 ... 6n, eliminate the additional label and supply the individual cells on connections 7-1 ... 7n towards the devices TU1 ... TUn. As the number and the position of the bits making up the label are known and the cells have a constant length, the person with skill in the art will have no difficulty in realizing a device capable of performing the required functions: e.g. the units PD can be suitably timed registers.

Units PED receive the proper control signals from the control unit CT through connections 8-1 ... 8k. Units PAC, PED are the processing units for the ATM cell flow which are the subject of the invention.

In the preferred embodiment which will be described hereafter, cell aggregation is carried out on electrical signals, and compression and concentration operations are carried out on optical signals. Similarly, expansion is carried out optically and decomposition of aggregates in electrical form. Since connections E, U are of an optical type, termination devices TE, TU will incorporate the required optical-to-electrical conversion devices and vice versa. This is not an additional complication for the switching system structure since these conversion devices are provided in any case when optical flows on input/output lines are organized as usual according to the standard synchronous digital hierarchy (SDH), because SDH frames are processed in an electrical form. Connections 100, 101 represent the connections between termination devices TE, TU and the control units CT.

Figure 2:
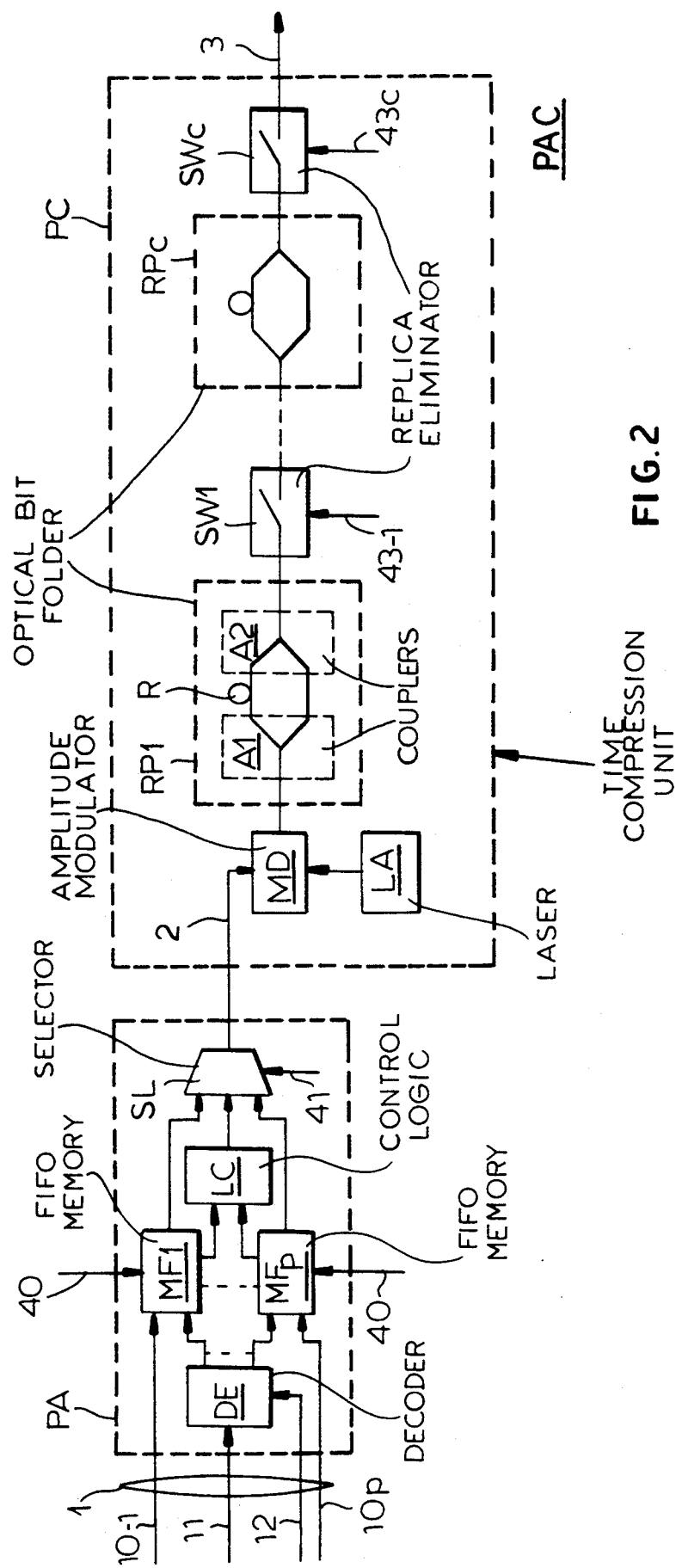
FIG. 2 is a block diagram which shows the structure of the cell aggregation and compression units.

FIG. 2 shows a possible embodiment of units PA, PC.

Unit PA mainly consists of a bank of FIFO memories (10 in the example considered) MF1 ... MFp, each of which organizes a queue of cells relevant to the same virtual path to form aggregates. Considering that memories receive cells at random, the writing/reading control units must be able to recognize the preset number of cells has been written and, once this number is reached, to start reading even if any cell to be inserted in a successive aggregate is still being written. To avoid excessive delays, reading must start in any case after a maximum preset time is out even if the aggregate is not complete. This maximum time will be counted by a suitable counter, provided in the control units of the memory itself and started when the first aggregate cell arrives, by using clock signals supplied by the time base of the electrical control network CT by means of wire 40 belonging to one of the connections 4 in FIG. 1. For drawing simplicity, said control units are incorporated into the blocks MF; memories organized to allow these operating procedures are well known in the art.

A label valid within the cross-connect system (containing service information in general and information about the aggregate characteristics in particular) will also be added at the head of each aggregate; the label is supplied by TE through the relevant connection 10-1 . . . 10p (which is part of line 1 in FIG. 1) and is loaded into the memory when the arrival of the first cell of an aggregate is recognized. This label will generally be used by the decomposition units PD. Service labels of this type are created by the units TE also in the case of conventional ATM cross-connect systems (e.g. that described by A. L. Fox et al. in the paper "RACE BLINT: a technology solution for the broadband local network", presented at IEE Conference on Integrated Broadband Services and Networks, October 1990, London).

Cells to be stored come from TE, through a connection 11 (which is also part of line 1) connected to the input of a decoding network DE presenting p outputs respectively connected to memories MF1 . . . MFp. Through connection 12, DE receives from TE, as control signals, the label bits of each cell arriving to TE (and therefore the bits of the label which has not undergone conversion yet) which identify the virtual path and, according to such label, it routes the cell towards the proper memory MF.

The outputs of memories MF are connected to the inputs of a selector SL the output of which is output 2 of block PA. The selector must act in synchronism with multiplexer MU and, more precisely, it must transfer an aggregate to its output at an instant such that, taking into account the time required for compression, the aggregate is present on output connection 3 of the concerned block PAC at the moment when MU is scanning the connection itself. The aggregate which SL must transfer to the compression units PC will be the or an aggregate ready in one of the memories MF (e.g. the first one completed) or the or an aggregate for which maximum hold time in memory has already expired. The selector will then be associated to a control logic LC receiving from control units of the individual memories MF signals indicating that an aggregate has been formed or that the preset time has expired.

Alternatively the different selector inputs can be cyclically scanned.

It is to be noted that data will be generally written and read in parallel (e.g. on 8 bits) in memories MF. Considering that compression units, as it will later be better examined, must act on one bit at a time, devices for the parallel-to-series conversion of the information flows must be provided. In the drawing, these devices have been incorporated into block SL, which will receive the necessary timing signals from the time base through connection 41. Obviously serialization could be carried out upstream of SL.

The formation of aggregates of 8-16 cells, as supposed by way of example, allows a significant reduction of the number of information units to be processed in CM without increasing remarkably the delay across the cross-connect system.

The necessity of limiting the delay advices to use the invention at the level of a cross-connect system because at this level the traffic concerning a virtual path will be sufficiently high to allow reaching in relatively short times the number of cells desired for an aggregate.

Anyhow, in theory, the invention could be used in any switching node, by forming cell aggregates which have to follow the same path in the connection network CM.

Serialized aggregates, consisting of bit strings where each bit has the same duration and period as the bits of the cells present on connections E, are supplied to the bit time compression unit PC.

The unit PC comprises:

a mode locked laser LA, generating a succession of pulses with a duration much lower than that of the bits present on connection 2 and a period equal to the bit time To of these bits;

an electro-optical amplitude modulator MD, which receives the pulses from laser LA and the signal present on connection 2, and in which each bit of this signal modulates the pulses outgoing from laser LA with an on/off modulation; in this way an optical signal consisting of a succession of bits having a duration which is equal to that of the pulses emitted by LA and a period To is obtained on connection 5;

a succession of c elements RP1 . . . RPc (with $2^c = C$), each of which effects the folding on itself of the bit string relevant to an aggregate, halving its duration each time. As indicated for RP1, each element RP comprises an input coupler A1, sharing the power associated to each optical bit between two different paths, and an output coupler A2 recombining the signals coming from the two paths. An output of the input coupler A1 and an input of the output coupler A2 are directly connected and form one of the two paths; the second path is obtained by connecting the second output of A1 to the second input of A2 through a delay element R which causes the bits in the second half of the aggregate to be arranged interleaved with the bits of the first half in the output coupler A2. If y is the number of bits in each aggregate, this is obtained if the delay element R in the first folding element RP1 introduces a delay of $(y-1)To/2$ with respect to the signals sent along the other path, that of the second folding element RP2 introduces a delay of $(y-1)To/4$, etc. In general, the delay element of the i-th folding element RP1 will introduce a delay $(y-1)To/2^i$.

As a consequence of the forwarding of the bits of an aggregate on two paths and of the successive recombination, at the output of each folding element RP1 . . . RPc each aggregate will be associated to a replica. Hence each element RP will be followed by a unit, schematized by switches SW1 . . . SWc, which will be operated to eliminate this replica, as it will better be seen further on. These switches are controlled by signals supplied by the control units through connections 43-1 . . . 43c, which are part of the proper connection 4 in FIG. 1. Units such as SW1 . . . SWc are well known in the art, and hence further information is unnecessary.

On output 3 of unit PC there is therefore a succession of aggregates with an overall duration yTo/2$^c$ and period yTo. From the foregoing description it can be clearly seen that once the compression factor is established, it is immediate to determine the instant of the exit of the aggregates from memories MF in such a manner that the aggregates reach multiplexer MU within the time devoted to that particular line 3. During the interval between two aggregates, multiplexer MU will forward on line IN the compressed aggregates supplied by the other units PC of the same block PAC.

Compressed aggregates on lines IN are then switched inside CM with the procedures required the particular network.

It is to be noted that at the instant when an aggregate is forwarded to the switching network CM, the line exchange and termination devices TE will forward to the control unit CT-the necessary routing information: as a matter of fact these should not undergo compression as the control unit would not be able to read them.

Operation of unit PC is shown in FIGS. 3a–3e considering by way of example the case of an aggregate with y=8 bits to be time compressed by a factor C=4; two foldings are therefore required.

FIG. 3a shows schematically the aggregate to be compressed, formed by bits the duration of which is substantially equal to period To. FIG. 3b shows the aggregate converted into optical form, with bits having a strongly reduced duration and period To, arriving at input of coupler A1 of RP1 and propagating towards A2 without undergoing delays in RP1. The delay element R1 of RP1 introduces a delay 7To/2 by giving the sequence in FIG. 3c. Bit 1 outgoing from R1 occurs at half the interval between bits 4 and 5 of the non delayed sequence (and therefore at the central instant of the duration of the aggregate); bit 2 outgoing from R1 occurs at half the interval separating the arrival of bits 5 and 6 of the non delayed sequence, etc. At the output of RP1 (FIG. 3d), an initial group of bits (bits 1–4 of the non delayed aggregate) is followed by a sequence of bits in which the bits of the second half of the original aggregate are interleaved with those of the first half, and this sequence is still followed by a queue of bits consisting of bits 5–8 of the delayed sequence. Bit time is T1=To/2. The initial group (head) and the queue, indicated as a dashed line in FIG. 3d, must be eliminated and for this purpose switch SW1 must be closed for a time Substantially equal to yTo/2 (duration of compressed aggregate) starting from the instant when the first bit of the aggregate exits from the delay element R of folding element RP1: considering as instant 0 that when the aggregate to be compressed arrives at the input of RP1, the closure of SW1 must substantially take place after a time 7To/2.

In the successive folding element RP (RP2), the delay element introduces a delay equal to 7To/4, i.e. 7/2 of the bit time of the aggregate already compressed by RP1. The first bit of the delayed sequence will reach the input of the output coupler A2 at half the interval separating bits 6 and 3 of the non delayed sequence (and therefore again in correspondence with central instant of the duration of the aggregate). In this way the bits in the second half of the aggregate are interleaved again with those of the first half of the aggregate that is entering into the element. At the output of the second folding device the sequence shown in line 3e is obtained, with a duration equal to ¼ of the original one. Also in this case it will be necessary to eliminate by means of the switch following RP2 the head (bits 1, 5, 2, 6, of the non delayed sequence) and the queue (bits 3, 7, 4, 8 of the delayed sequence) of the bit flow outgoing from RP2: neglecting the propagation time between the output of SW1 and the input of RP2, SW2 will be closed for a time equal to yTo/4 starting from an instant that follows by 7To/4 the arrival of the first bit of the non delayed sequence. The head and queue are not shown any more in FIG. 3e.

If C>4 (and hence c>2) the operations are repeated identical in the successive folding units and after c folding, the bit period will be Tc=To/2$^c$.

Comparing lines 3b, 3e, it can be seen clearly that the signal present at the output of a unit PC consists of very short sequences of bits which occupy only a fraction ½$^c$ of the original duration of the aggregate. This explains the use of multiplexer MU (FIG. 1), which inserts into the unused time the compressed aggregates relevant to other input lines of the same unit PAC.

Figure 4:
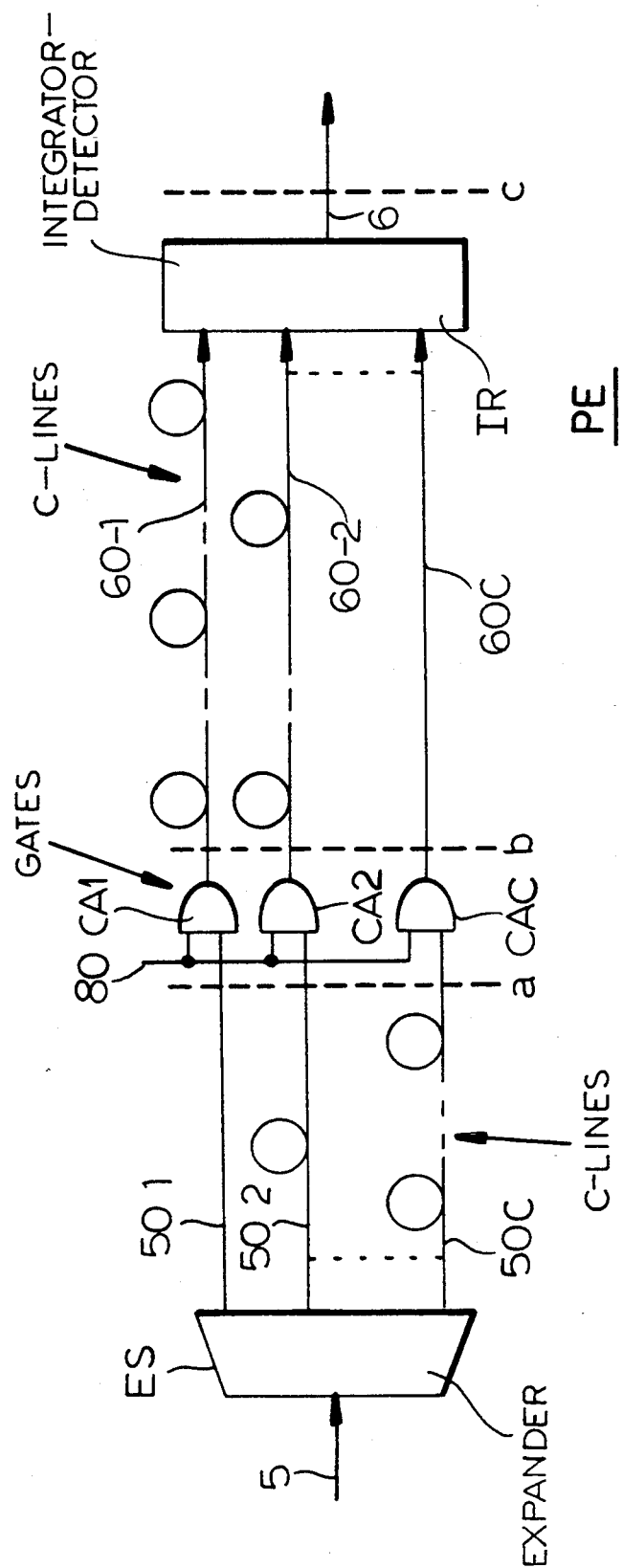
FIG. 4 is a block diagram which shows the structure of the decompression units.

Referring to FIG. 4, cell aggregates present at output 5 of a demultiplexer DM (FIG. 1) are supplied at the input of an expander ES which has C outputs and are transferred simultaneously on C lines 50-1 . . . 50C, which terminate at the inputs of the respective gates CA1 . . . CAC, sampling with period To the bit strings present on the respective line 50. Control signals for gates CA are supplied by the control units CT through a line 80 which is part of one of the connections 8 in FIG. 1. Also the realization of gates such as gates CA is well known in the art, and hence further information is unnecessary. Lines 50 have lengths which are different and progressively increasing from line 50-1 to line 50C and so they introduce a progressively increasing delay on the signals conveyed. For what concerns the invention, the interest lies in the relative delay between one line and the line preceding it, which must be equal to the period Tc of the compressed bits. The minimum delay (line 50-1) can therefore be considered as equal to 0, while the generic line 50j (j=1 . . . C) will introduce a delay (j−1)Tc.

Outputs of gates CA1 . . . CAC are connected through the respective lines 60-1 . . . 60C to an integrator-detector IR which effects an integration in the time of the bits received and their conversion into electrical form, so as to reconstruct the cell aggregates corresponding to those outgoing from blocks PA (formed therefore by bits with period and duration To). In practice IR will be made up of a unit reconstituting the bit sequence and of an optical-to-electrical converter. Lines 60 have also different lengths, in order to introduce different delays on the bits that conveyed. The delay introduced by each line is a multiple of the overall duration y·Tc of a compressed aggregate and it is progressively increasing, by steps of y·Tc, from line 60C to line 60-1. More particularly, the delay will vary from 0 (line 60C) to (C−1)·y·Tc (line 60-1) and, for the generic line 60j, it will be (C−j)·y·Tc. The reasons for the choice of the given values for the delay introduced by lines 50, 60 will appear clearly from the description of the operation of unit PE, with reference to FIGS. 5a–5c.

Here the espansion of the 8-bit aggregate compressed by a factor C=4 as shown in FIG. 3 has been shown by way of example. FIG. 5a shows the situation of the aggregates on lines 50-1 ... 50-4 at the input of the sampling gates CA, FIG. 5b the situation on lines 60-1 ... 60-4 at the output of the same gates. The first sampling pulse CK0 for the aggregate being examined reaches gates CA at the moment when bit 1 of the aggregate is present at the input of gate CA connected to line 50-4; due to the various delays introduced by lines 50-2 ... 50-4 with respect to line 50-1, at the same instant bits 7, 5, 3 are present respectively on lines 50-1, 50-2, 50-3, the second sampling pulse CK1, which arrives after time To=4Tc, lets bits 8, 6, 4, 2 pass at the outputs of gates CA1 ... CA4: on the four lines 60 four distinct pair of bits, each comprising bits that were adjacent in the original aggregate, propagates towards the integrator. The bits of each pair are spaced by the original bit time. Line 60-4 is the one with the least delay and therefore bit 1 is effectively the first bit reaching the input of integrator IR. The immediately preceding line 60-3 introduces a delay of 8Tc (=2To), and therefore, before a bit present on this line reaches integrator IR, this receives bit 2 from line 60-4. After a time 2To passes, IR will receive bit 3 followed by bit 4, and so on. The original sequence of the bits has therefore been reconstituted at the input of IR. Integrator IR will then bring each bit back to its original duration and convert it into electrical form, giving the sequence in FIG. 5c, which reproduces exactly the one present at the input of a unit PC.

It is to be noted that the above described expansion scheme requires the overall length of the aggregates to be a multiple of compression factor C. This does not constitute a limitation because it is sufficient to choose suitably the number of cells in the aggregate, if the length of same does not satisfay this condition.

It is clear that what has been described has been given only by way of non limiting example and that variations and modifications are possible without departing from of the scope of the invention. So, for example, multiplexers MU can be replaced by passive combining devices, receiving in a sequential way the compressed aggregates outgoing from one group of compression units PC. Obviously, the demultiplexers DM will be then replaced by complementary passive distribution units. In this case it will be the time base to establish the reading instant of the various aggregates in memories MF so that they arrive at the inputs of the multiplexing unit with the required sequence.

Moreover, the folding elements RP could be realized so as to form a number of replicas of the aggregate different from 2, e.g. 3, 5, etc ... , obtained by delaying the input aggregate of multiples of To/3, To/5 ...., so that compression ratios will be obtained which are powers of 3, 5, etc. In this case, if z is the number of replicas formed, the delay element R constituting the x-th path inside the i-th element of the succession of folding elements will have to introduce a delay of $(x-1)(y-1)To/z^i$ on the signals that run across it.

We claim:

1. An optical switch for fast cell switching networks, said switch having switch inputs and outputs, said switch comprising:
    an optical interconnection network having inputs and outputs;
    an electrical control network connected to the optical interconnection network and including means for managing switching, through the optical interconnection network, of cell aggregates;
    respective termination devices assigned and connected to each switch input and each switch output for splitting information to be forwarded to the electrical control network from information to be processed in the interconnection network, and recombining into a cell flow, information coming from the control network and information coming from the interconnection network; and
    means for time compression of signals to be switched and time expansion of switched signals,
    said means for time compression including means assigned and connected to each input of the interconnection network forming said cell aggregates by associating a plurality of cells which must follow a given path through the interconnection network and performing said time compression by acting on the aggregates, in order to form information units the duration of which is equal to a pre-set fraction of an original duration of an aggregate and an information content of which, as a number of bits, is equal to the sum of information contents of the aggregate cells;
    said means connected to each output of the interconnection network for time expansion including means for restoring an original duration to the aggregates outgoing from the interconnection network, and separating individual cells from said aggregates before forwarding them to said switch outputs.

2. An optical switch according to claim 1 wherein the optical interconnection network has a number (k) of inputs/outputs (IN1 ... INk, OU1 ... OUk) lower than a number of (n) of switch inputs and outputs (E1 ... En, U1 ... Un), each of the means for compression comprising means (MU1 ... MUk) for multiplexing, on each input line (IN1 ... INk) of the interconnection network (CM), compressed aggregates of cells of a plurality of said switch inputs (E1 ... Eh) connected to the same aggregation and compression means (PAC1 ... PACk); the means for expansion (PED1 ... PEDk) including means for distributing the compressed aggregates present on the same output of the interconnection network (CM) among a plurality of said switch outputs (U1 ... Un).

3. An optical switch according to claim 1 wherein the optical switch is an ATM digital cross-connect system and the aggregation and compression means (PAC1 ... PAk) form aggregates comprising a preset number of cells of a common virtual path in said system.

4. An optical switch according to claim 3 wherein the aggregation and compression means (PAC1 ... PAk) form cell aggregates by acting on electrical signals and perform compression by acting on optical signals and comprise, for each of said switch inputs (E1 ... En), a unit (PA1 ... PAn) for cell aggregation followed by a unit (PC1 ... PCn) for compression of aggregates, the units for cell aggregation comprising:
    a decoding network (DE) having a data input at which it receives the cells to be switched coming from a respective switch input line (E1 ... En) and a plurality of outputs, each having a different virtual path, the decoding network (DE) forwarding each cell on an output selected according to information taken from said cells and supplied to a control input, which codes the virtual path for the cell;
    a plurality of memories (MF1 ... MFp) respectively connected to outputs of the decoder (DE) and forming a queue of the cells from the decoder to form said aggregates;

a selector (SL) having a plurality of inputs each connected to the output of one of the memories and an output on which the aggregates to be forwarded to a respective compression unit (PC1 ... PCn) appear;

each of said compression units (PC1 ... PCn) comprising:

a mode locked laser (LA), which generates a succession of pulses having a duration (Tc) which is much less than that of the bits of the cell aggregates outgoing from the said selector (SL), and a period (To) equal to the period of the said bits;

an electro-optical amplitude modulator (MD), which receives the pulses emitted by the laser (LA) and the bits of the aggregates outgoing from the selector (SL), which amplitude modulates the pulses emitted by the laser (LA), the modulator emitting an optical signal consisting of a succession of bits with duration (Tc) equal to that of the bits of the aggregates; and a succession of folding elements (RP1 ... RPc), which receives the signals outgoing from the modulator (MD), and in which each element causes the interleaving between the bits of the first part of an aggregate of the bits in the remaining part or parts of the aggregate itself, so as to reduce the duration of the aggregate to a fraction of the original duration, an output of the succession of folding elements being connected to an input of the means for multiplexing (MU1 ... MUn).

5. An optical switch according to claim 4 wherein each memory (MF1 ... MFp) has control units for writing and reading, which cause reading whenever the pre-determined number of cells has been written or after a maximum preset time.

6. An optical switch according to claim 4 wherein each memory (MF1 ... MFp) is provided with means for joining to each aggregate a local label, generated by said termination devices (TE1 ... TEn) at said switch inputs and containing service information.

7. An optical switch according to claim 4 wherein each folding element (RP1 ... RPc) comprises:

an input coupler (A1) which shares power associated with each optical bit among a number of outputs associated with as many different paths and forms on each path a replica of the input aggregate;

an output coupler (A2) which presents as many inputs as the number of said paths, recombines the replicas present on said paths and has a first input directly connected to a first output of the input coupler to form one of said paths; and delay elements (R) inserted between each of the other outputs of the input coupler (A1) and one input of the output coupler (A2) to form one of the other paths, the delay element (R) which constitutes the x-th path introducing a delay of $(x-1)(y-1)To/z^i$ on the signals which run across it, where: y is a number of bits in an aggregate; To is a bit period before compression; E is a number of the paths; i ($1 \leq i \leq c$) is the serial number of the folding element in the succession.

8. An optical switch according to claims 7 wherein each folding element halves the duration of an aggregate and comprises:

an input coupler (A1) which shares power associated with each optical bit between two outputs associated with two different paths;

an output coupler (A2) which recombines the signals present on the two paths and has a first input directly connected to a first output of the input coupler to form one of the said paths; and a delay element (R), inserted between the second output of the input coupler (A1) and a second input of the output coupler (A2) to form the second path, and introducing a delay $(y-1)To/2^i$ on the signals traversing said delay element (R), where: y is the number of bits in an aggregate; To is the bit period before compression; i ($1 \leq i \leq c$) is the serial number of the folding element in the succession.

9. An optical switch according to claim 7 wherein each folding element (RP1 ... RPc) is followed by a switch (SW) which is closed for the time corresponding to the duration of an aggregate outgoing from the element starting from the moment when the first bit of the aggregate exits from the delay element (R), in order to eliminate redundant parts of the replicas of the aggregate.

10. An optical switch according to claim 4 wherein the means for multiplexing (MU1 ... MUn) are constructed and arranged to scan cyclically the outputs of the compression means (PC), and said selector (SL) is connected to a control logic network (LC) which causes transfer to output of an aggregate in synchronism with the operation cycle of the multiplexing means (MU1 ... MUn), so that a compressed aggregate is present at an input of the multiplexing means (MU1 ... MUn) in the time interval designed for the scanning of such input.

11. An optical switch according to claim 4 wherein the multiplexing means (MU1 ... MUn) consist of passive recombining devices, and a control logic (LC) of said selector (SL) is slaved to a time base of the electrical control network (CT) of the switch to cause transfer to output of a compressed aggregate so that it reaches an input of the multiplexing means at a preset instant.

12. An optical switch according to claim 11 wherein the termination devices (TE1 ... TEn) are slaved to a time base of the control unit so as to supply to said control unit information about the routing of a compressed aggregate in synchronism with the arrival of the aggregate at an interconnection network.

13. An optical switch according to claim 11 wherein the means (PED1 ... PEDk) for aggregate expansion and the means for cell separation comprise, for each switch output, a unit (PE1 ... PEn) for time expansion of bits of the aggregates and their conversion into electrical form, followed by a unit (PD1 ... PDn) for cell separation acting on electrical signals, and in that the expansion and conversion unit (PE1 ... PEn) comprises:

an expander (ES), which has an output connected to an output of a demultiplexer (DM) and a plurality of outputs, in a number equal to factor (C) by which the duration of the aggregates has been reduced in the compression unit (PC1 ... PCn), and which presents on all its outputs the bits constituting the received aggregate;

a first group of lines (50-1 ... 50c), which are connected each to an output of the expander and have lengths that are different and progressively increasing from a first line (50-1) to a last one (50C), so as to introduce a progressively increasing delay on the signals conveyed;

a group of sampling gates (CA1 . . . CAC), each having an input connected to one of the lines of the first group (50-1 . . . 50C), and sampling bit aggregates propagating on said lines with a period equal to the bit time of the non-compressed aggregates, in order to form distinct groups of bits which are consecutive in the original aggregate;

a second group of lines (60-1 . . . 60C), which are connected each to the output of one of said gates and have lengths that are different and progressively decreasing from a first line (60-1) to the last one (60C), so as to introduce on the signals conveyed a progressively decreasing delay such that said signals arrive at the end of the respective lines at such instants as to allow the reconstruction of the succession of the bits in the aggregate received by the expansion and conversion unit (PE1 . . . PEn); and a detector (IR) which has a plurality of inputs connected to the lines of the second group (60-1 . . . 60C) and which reconstitutes the succession of bits and performs their conversion into electrical form and an integration in the time, reconstituting cell aggregates in which the bits have their original duration.

14. An optical switch according to claim 13 wherein the lines of the first group (50-1 . . . 50C) have such lengths that each of them introduces, on the signals conveyed, a delay exceeding by a quantity equal to the period (Tc) of the compressed bits the delay introduced by the preceding line, and the lines of the second group (60-1 . . . 60C) have such lengths that each of them introduces on the signals conveyed a delay exceeding by a quantity equal to the duration of a compressed aggregate the delay introduced by the successive line.

* * * * *